United States Patent
Wittenberg et al.

(10) Patent No.: US 7,167,126 B2
(45) Date of Patent: Jan. 23, 2007

(54) RADAR SYSTEM AND METHOD FOR DETERMINING THE HEIGHT OF AN OBJECT

(75) Inventors: Peter Wittenberg, St. Louis, MO (US); Aaron Y. Mosher, Madison, AL (US)

(73) Assignee: The Boeing Company, Chicago, IL (US)

(*) Notice: Subject to any disclaimer, the term of this patent is extended or adjusted under 35 U.S.C. 154(b) by 255 days.

(21) Appl. No.: 10/935,009

(22) Filed: Sep. 1, 2004

(65) Prior Publication Data

US 2006/0044177 A1  Mar. 2, 2006

(51) Int. Cl.
*G01S 13/08* (2006.01)
*G01S 13/94* (2006.01)

(52) U.S. Cl. .................. 342/123; 342/127; 342/70; 342/194

(58) Field of Classification Search .............. 342/123
See application file for complete search history.

(56) References Cited

U.S. PATENT DOCUMENTS

| | | | | |
|---|---|---|---|---|
| 2,929,059 A | * | 3/1960 | Parker | 342/141 |
| 4,150,378 A | * | 4/1979 | Barton | 342/107 |
| 4,342,997 A | * | 8/1982 | Evans | 342/156 |
| 4,796,031 A | * | 1/1989 | Koki | 342/148 |
| 5,170,171 A | * | 12/1992 | Brown | 342/191 |
| 5,448,241 A | * | 9/1995 | Zeoli et al. | 342/25 A |
| 5,557,282 A | * | 9/1996 | Mertens | 342/123 |
| 5,608,405 A | * | 3/1997 | Pritt | 342/25 C |
| 5,867,119 A | * | 2/1999 | Corrubia et al. | 342/120 |
| 6,819,285 B1 | * | 11/2004 | Stockman et al. | 342/123 |
| 6,901,264 B2 | | 5/2005 | Myr | |

FOREIGN PATENT DOCUMENTS

DE  3740142 A1 *  6/1989  .............. 342/159

OTHER PUBLICATIONS

Sloan, G., "Affordable, Miniaturized SAR for Tactical UAV Applications," Sandia National Laboratories, 2003, 10 pages.
Sandia National Laboratories, "What is Synthetic Aperture Radar?," www.sandia.gov/RADAR/whatis.html, 2004, 3 pages.
Sandia National Laboratories, "Synthetic Aperture Radar Applications," www.sandia.gov/RADAR/sarapps.html, 2004, 3 pages.

* cited by examiner

*Primary Examiner*—Thomas H. Tarcza
*Assistant Examiner*—Matthew M. Barker
(74) *Attorney, Agent, or Firm*—Senniger Powers

(57) ABSTRACT

System and method for determining the height of an object reflecting a real beam radar signal by receiving the reflected signal with a first and second vertically spaced antennas. Receivers provide two signals indicating the phase of the reflected signals received by the two antennas. A digital processor determines the phase difference between the two signals and calculates the object height.

21 Claims, 3 Drawing Sheets

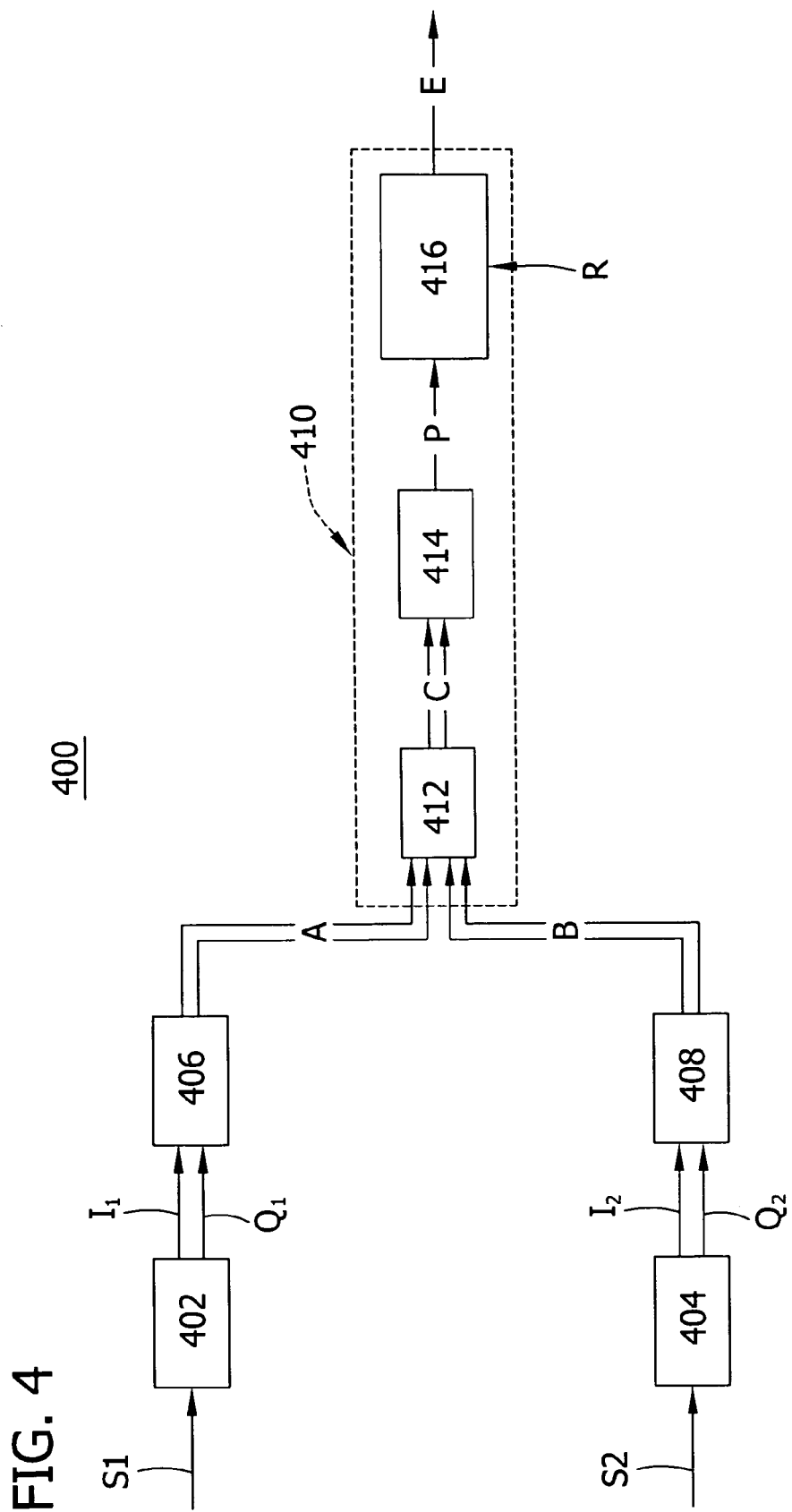

RADAR SYSTEM AND METHOD FOR DETERMINING THE HEIGHT OF AN OBJECT

FIELD OF THE INVENTION

The present invention generally relates to mapping an area using radar and, more particularly, to a radar system and method for producing a three-dimensional map of an area. Further, the invention relates to a real beam radar system and method for three-dimensional ground mapping for use in autonomous vehicle navigation.

BACKGROUND OF THE INVENTION

The use of radar in navigation allows mapping of sectors. For example, autonomous ground vehicle navigation has used radar to produce a two-dimensional map of the terrain ahead of the vehicle. Referring to FIG. 1, a grid comprising range RA and cross-range CR dimensions to define cells such as cell C has been employed to lay out the area in front of the vehicle. The difficulty of traversing an obstacle in a cell of the grid was assumed to be proportional to the amplitude of the returned radar signal from the cell. This assumption can be impractical in certain environments because different shapes reflect radar signals differently. For example, a very small corner reflector may return a much greater amplitude signal than a very large obstacle of a different shape. Thus, the amplitude of the reflected radar signal may not be indicative of obstacle height.

Mapping techniques using laser scanning create a three-dimensional map using range, cross-range and height. The height is measured by sweeping the laser vertically with respect to an obstacle. This type of sweep used in laser scanning can be impractical in real beam radar systems and other radar systems which do not employ lasers because the radar signal in real beam systems tend to have a very wide beam which does not allow sufficient accuracy and consistency to provide useful information regarding the height of the object. Lasers systems cannot operate in low visibility conditions because they are based on a light beam, whereas radar systems of the proper design can operate in any conditions.

Interferometric synthetic aperture radar (IFSAR) has employed techniques to determine relative height of objects being mapped. However, these IFSAR techniques do not result in sufficient information to consistently provide actual height information. Also, IFSAR cannot be used on ground vehicles because it relies on doppler information integrated over time. Ground vehicle guidance does not generate sufficient Doppler information over time for integrating.

Thus, there is a need for a system and method for measuring the height of an object reflecting a real beam radar signal.

SUMMARY OF THE INVENTION

In accordance with one embodiment, the invention comprises a system for determining a height of an object reflecting a real beam radar signal. A first antenna receives the reflected real beam radar signal and provides a first antenna output signal corresponding to the reflected real beam radar signal received by the first antenna. A second antenna receives the reflected real beam radar signal and provides a second antenna output signal corresponding to the reflected real beam radar signal received by the second antenna. A first receiver receives the first antenna output signal and provides a first receiver output signal indicating the phase of the signal received by the first antenna. A second receiver receives the second antenna output signal and provides a second receiver output signal indicating the phase of the signal received by the second antenna. A processor receives the first receiver output signal and the second receiver output signal and provides an output signal corresponding to the height of the object. The output signal is a function of the phase difference between the first antenna output signal and the second antenna output signal.

In accordance with another embodiment, the invention comprises a method for determining a height of an object reflecting a real beam radar signal. The phase of a reflected real beam radar signal received at a first vertical height is determined. The phase of the reflected real beam radar signal received at a second vertical height different than the first vertical height is determined. A phase difference between the first reflected real beam radar signal and the second reflected real beam radar signal is determined. The height of the object is determined based on the determined phase difference.

In accordance with another embodiment, the invention comprises a method for determining a height of an object reflecting a real beam radar signal. A first reflected real beam radar signal is received. A second reflected real beam radar signal is received. A first phase signal indicating the phase of the received first reflected real beam radar signal is generated. A second phase signal indicating the phase of the received second reflected real beam radar signal is generated. An output signal corresponding to the height of the object is provided. The output signal is a function of the phase difference between the first phase signal and the second phase signal.

In accordance with another embodiment, the invention comprises an autonomous vehicle navigation system for determining a height of an object reflecting a real beam radar signal including a vehicle and a first antenna mounted on the vehicle for receiving the reflected real beam radar signal and providing a first antenna output signal corresponding to the reflected real beam radar signal received by the first antenna. A second antenna mounted on the vehicle for receiving the reflected real beam radar signal and providing a second antenna output signal corresponding to the reflected real beam radar signal received by the second antenna. The central point of the first antenna is positioned in a horizontal plane which is different than a horizontal plane in which the central point of the second antenna is positioned. A first receiver for receiving the first antenna output and providing a first receiver output signal indicates the phase of the signal received by the first antenna. A second receiver for receiving the second antenna output and providing a second receiver output signal indicates the phase of the signal received by the second antenna. A processor for receiving the first receiver output signal and the second receiver output signal provides an output signal corresponding to the height of the object. The output signal is a function of the phase difference between the first antenna output and the second antenna output. A navigation system for controlling the vehicle as a function of the output signal.

In accordance with another embodiment, the invention comprises a computer-readable medium having computer-executable instructions for determining a height of an object reflecting a real beam radar signal. Instructions determine the phase of a first reflected signal received at a first vertical height. Instructions determine the phase of a second reflected signal received at a second vertical height different than the first vertical height. Instructions determine a phase difference between the first reflected signal and the second reflected signal. Instructions determine the height of the object based on the determined phase difference.

Other objects and features will be in part apparent and in part pointed out hereinafter.

BRIEF DESCRIPTION OF THE DRAWINGS AND APPENDIX

FIG. 4 is a block diagram illustrating one embodiment of a processor showing one way in which the analog signals of two vertically spaced antennas of a real beam radar system may be analyzed to determine the height of an object, according to the invention.

Figure 1:
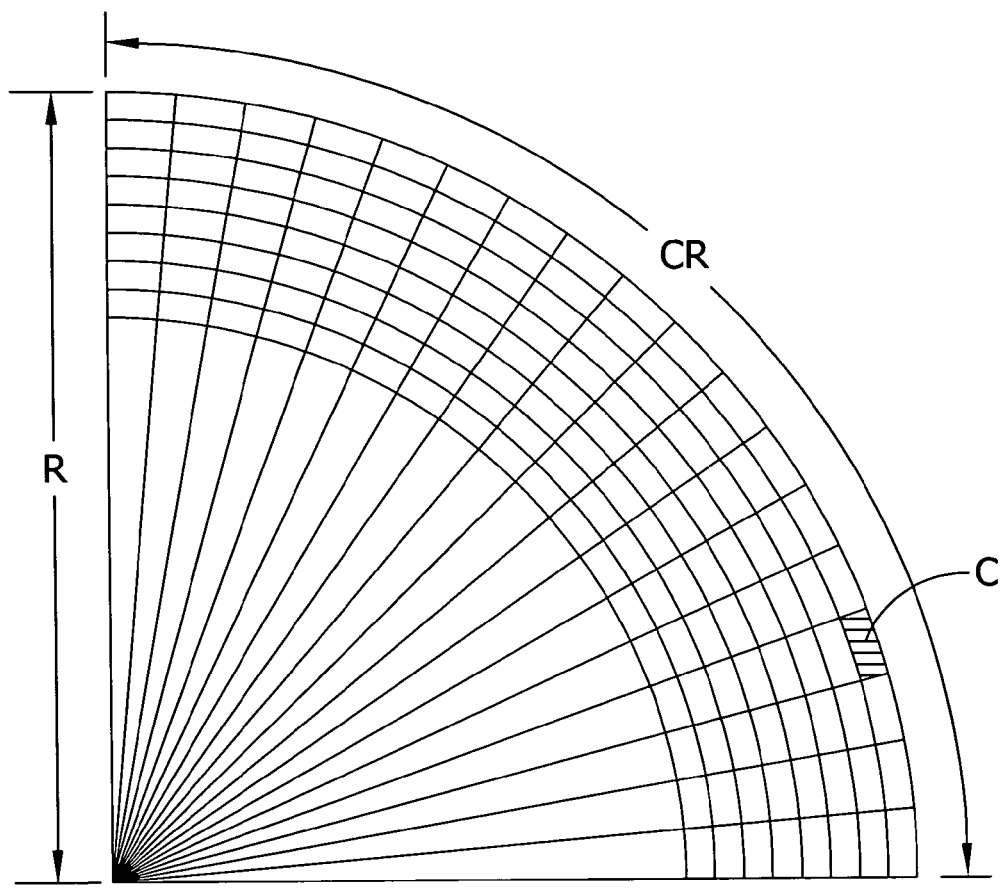
FIG. 1 is a graphical depiction illustrating a map of cells generated by a two-dimensional radar ground mapping system according to the prior art.

Appendix A is a code listing illustrating one embodiment of software for providing a height estimate by processing signals from two antennas of a real beam radar system, according to the invention.

Corresponding reference characters indicate corresponding parts throughout the drawings.

Abbreviations and Definitions

Real beam radar is a radar system that continuously transmits and receives a signal. The transmitted signal is usually frequency modulated such that the frequency sweeps repeatedly within a given frequency range. (e.g., referred to as continuous wave frequency modulated radar or CWFM radar)

Synthetic aperture radar is a pulsed radar system. The system transmits a radar pulse of a given frequency, waits to receive the reflected pulse and repeats the process over time at changing angle relative to the targets.

Interferometry is a process of extracting information from the interference pattern of two (or potentially more) different signals.

DETAILED DESCRIPTION OF THE PREFERRED EMBODIMENTS

FIG. 1 illustrates a map created with a monostatic real beam radar system. The system simultaneously searches for objects within a range/crossrange cell about range R with a particular crossrange CR. The information from each scan is combined to identify objects within the cells of the grid in FIG. 1. In the case of real beam radar, according to the invention interferometry is implemented by combining a monostatic radar and an additional, vertically spaced antenna that receives the reflected signal in order to provide information about the height of objects in each cell.

In the present invention, a first antenna A1 transmits a real beam radar signal in one crossrange CR having target objects that reflect the signal. The first antenna A1 and a second antenna A2 vertically spaced from the first antenna A1 both receive the reflected real beam radar signal and provide corresponding antenna output signals. The phase difference between the two antenna output signals is extracted, and a height of each target object in each range/crossrange cell at the crossrange CR can be calculated. This process is repeated for every crossrange CR in the area of interest to create a 3 dimensional map of the area including crossrange CR and range R to designate each cell, and a height associated with each cell.

Figure 2:
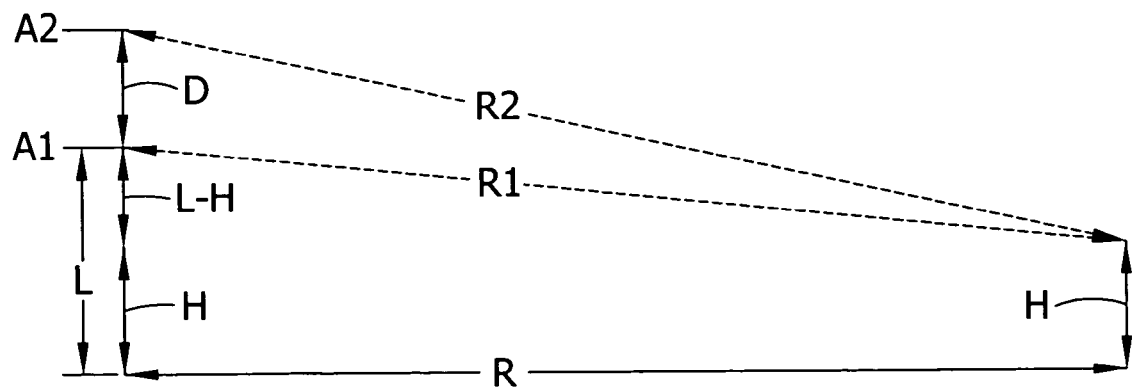
FIG. 2 is a graphical depiction illustrating the geometric relationships of two antennas (antenna A1 having height L and antenna A2 having height D positioned vertically above antenna A1) with reference to an object having a height H at a range R from the antennas, according to the invention.

FIG. 2 illustrates the invention for a single object. A first antenna A1 and a second antenna A2 have centers which are spaced apart by a vertical distance D with the lower at an elevation L above the horizontal. It is preferred, but not necessary to have the two antennas in the same vertical plane. As noted below, any deviation from the vertical plane can be compensated for in the signal processing portion of the invention. A target object with height H is located at a distance, or range R, from the vertical plane of the first antenna. The reflected real beam radar signal received by the first antenna A1 travels the path R1. The reflected real beam radar signal received by the second antenna A2 travels the path R2. Because the two paths R1 and R2 are of different lengths, there is a phase difference between the signal received by the first antenna and the signal received by the second antenna. An important aspect of the invention is preserving this phase relationship.

Referring to FIG. 2, the Pythagorean theorem shows:

$$R2 = \sqrt{[D+(L-H)]^2 + R^2} \text{ and} \tag{1}$$

$$R1 = \sqrt{[(L-H)]^2 + R^2}. \tag{2}$$

Combining the equations (1) and (2) yields:

$$R2 = R1 \cdot \sqrt{1 + \frac{D^2 + 2 \cdot D \cdot (L-H)}{R1^2}}. \tag{3}$$

One aspect of the present invention is directed toward approximating the height of the object. Two approximations transform the previous equation into a much more useful one: $R1 \approx R$ and $$\sqrt{1+s} \approx 1 + \frac{s}{2}$$

where s is a small number. Using these two approximations in equation (3) yields equation (4):

$$R2 - R1 = \frac{D^2 + 2 \cdot D \cdot (L-H)}{2 \cdot R}. \tag{4}$$

Substituting $\Phi$ for the phase difference in radians and $\lambda$ for the wavelength of the radar signal in equation (4) yields:

$$\Phi = \frac{D^2 + 2 \cdot D \cdot (L-H)}{2 \cdot R} \cdot \frac{2 \cdot \pi}{\lambda}. \tag{5}$$

Thus equation (6) approximates the height H of the object reflecting the radar signal as:

$$H = L + \frac{D^2 - \Phi \cdot 2 \cdot R \cdot \lambda}{4 \cdot D \cdot \pi}. \quad (6)$$

In equation (6), the elevation L of the lower antenna is a known predetermined value, the vertical separation D between the two antennas A1 and A2 is a known predetermined value, π is a known constant, and λ is a known predetermined value. Determining the range R of the object using real beam radar is known in the prior art. Thus, the height H of the object reflecting the real beam radar signal is a function of two variables: the phase difference Φ between the first and second antenna output signals and the range R to the object, both of which can be determined for each cell.

The phase difference Φ has phase ambiguity when the total change in height H causes a phase difference Φ greater than 2π radians (360°). Without using phase unwrapping techniques, the usable phase difference Φ limit is reached when the difference in height Δh times the phase change per unit height equals 2π radians, thus:

$$H_{unambiguous} \cdot \frac{d\Phi}{dH} \leq 2 \cdot \pi \quad (7)$$

The phase difference Φ has a rate of change relative to height defined by:

$$\frac{d\Phi}{dH} = -\frac{2 \cdot \pi}{\lambda} \cdot \frac{D}{R}. \quad (8)$$

Combining equations (7) and (8) yields:

$$H_{unambiguous} \leq \frac{R \cdot \lambda}{D}. \quad (9)$$

The resolution of the height within the unambiguous height limitation is limited by the minimum resolvable phase difference and governed by:

$$H_{resolution} \leq \frac{R \cdot \lambda}{D} \cdot \frac{\Phi_{resolution}}{2 \cdot \pi}. \quad (10)$$

For example, if the wavelength λ is 3.9 mm (which corresponds to 77 GHz), if the vertical separation D between antennas is 100 mm, and assuming a phase resolution of about 18 degrees (0.314 radians), then Table 1 results:

TABLE 1

Unambiguous Height Limit and Resolution

| Range (meters) | Unambiguous Height Limit (meters) | Height Resolution (meters) |
|---|---|---|
| 10 | 0.39 | 0.0195 |
| 20 | 0.78 | 0.039 |
| 30 | 1.17 | 0.0585 |
| 40 | 1.56 | 0.078 |
| 50 | 1.95 | 0.0975 |
| 60 | 2.34 | 0.117 |

TABLE 1-continued

Unambiguous Height Limit and Resolution

| Range (meters) | Unambiguous Height Limit (meters) | Height Resolution (meters) |
|---|---|---|
| 70 | 2.73 | 0.1365 |
| 80 | 3.12 | 0.156 |
| 90 | 3.51 | 0.1755 |
| 100 | 3.9 | 0.195 |

At a range of 50 meters, the unambiguous height limit is about 2 meters and the resolution is 0.1 meter (about four inches) which is large enough to cover most targets of interest for ground vehicle navigation.

In the above example, it was assumed that the minimum resolvable phase difference was 18 degrees. However, the minimum resolvable phase difference is proportional to the height resolution and the two are limited by a number of factors including: thermal noise, range error from range bin limitations, error in vertical spacing D or lower antenna elevation L, and motion of the system causing a pitch change.

The phase error is a direct function of the signal to noise ratio (SNR) from the radar. The formula for the standard deviation (in degrees) as a function of the signal to noise ratio, where N is the number of measurements averaged, is:

$$\sigma_\phi(deg) = (180/\pi) \frac{1}{\sqrt{2 \cdot N \cdot 10^{SNR(dB)/10}}}. \quad (11)$$

For a single measurement, Table 2 results:

TABLE 2

Standard Deviation

| SNR (dB) | Standard Deviation (deg) |
|---|---|
| 0 | 57.29578 |
| 5 | 32.21978 |
| 10 | 18.11852 |
| 15 | 10.18879 |
| 20 | 5.729578 |
| 25 | 3.221978 |
| 30 | 1.811852 |
| 35 | 1.018879 |
| 40 | 0.572958 |

Range bin limitations are a source of error because a target determined to be in a particular range bin can be anywhere in that range bin. The correct range R to use for the target object is the range to the scattering center. What is actually used is normally the center of the range bin, but may be some other approximation. Having an error in the range R of the object causes a small error in-phase. For a system with a range bin of 0.25 meters, this is a small error. If the error is seen as unacceptably large, it is possible to use more range bins to get a more accurate range R estimate.

Errors in the vertical separation D between the two antennas and the elevation L of the lower antenna also cause phase difference Φ error which ultimately causes a height H estimate error. These errors are easily corrected by calibrating the system once it is in place.

Vehicle motion causing a change in the pitch of the radar system is also a source of error. The height H of the target object is really measured along a line perpendicular to the azimuth plane of the central points of the antennas, and halfway between them. If the vehicle is tilted, the azimuth plane of the radar is tilted as well. Height measurements become the height along the line perpendicular to the tilted azimuth plane. The error introduced is:

$$H_{error} = \text{PitchError} \cdot R. \tag{12}$$

For the above example, a 1 degree pitch error at a 50 meter range gives a height error of 0.87 meters. That error is absolute, not relative. This has no impact on the relative heights of the terrain seen, so there may be clues to these height errors from processing applied to the scene as a whole. To compensate for vehicle pitch error the radar is stabilized in three axes. This may be accomplished by using a mechanical compensation system such as a gimbal system. An electronic compensation system can also be used to detect the pitch and correct for height H in the processing of the information, or a mechanical compensation system and electronic compensation can be used simultaneously.

Error compensation may be entirely electronic. The phase difference Φ corresponding to zero height (ground level) will likely be the phase difference Φ that is most common across the range bins. When reasonable assumptions such as this are coupled with previous measurements from a previous radar sweep, even uncompensated, relative height measurements may be interpolated into absolute height measurements to create a useful 3 dimensional map.

Figure 3:
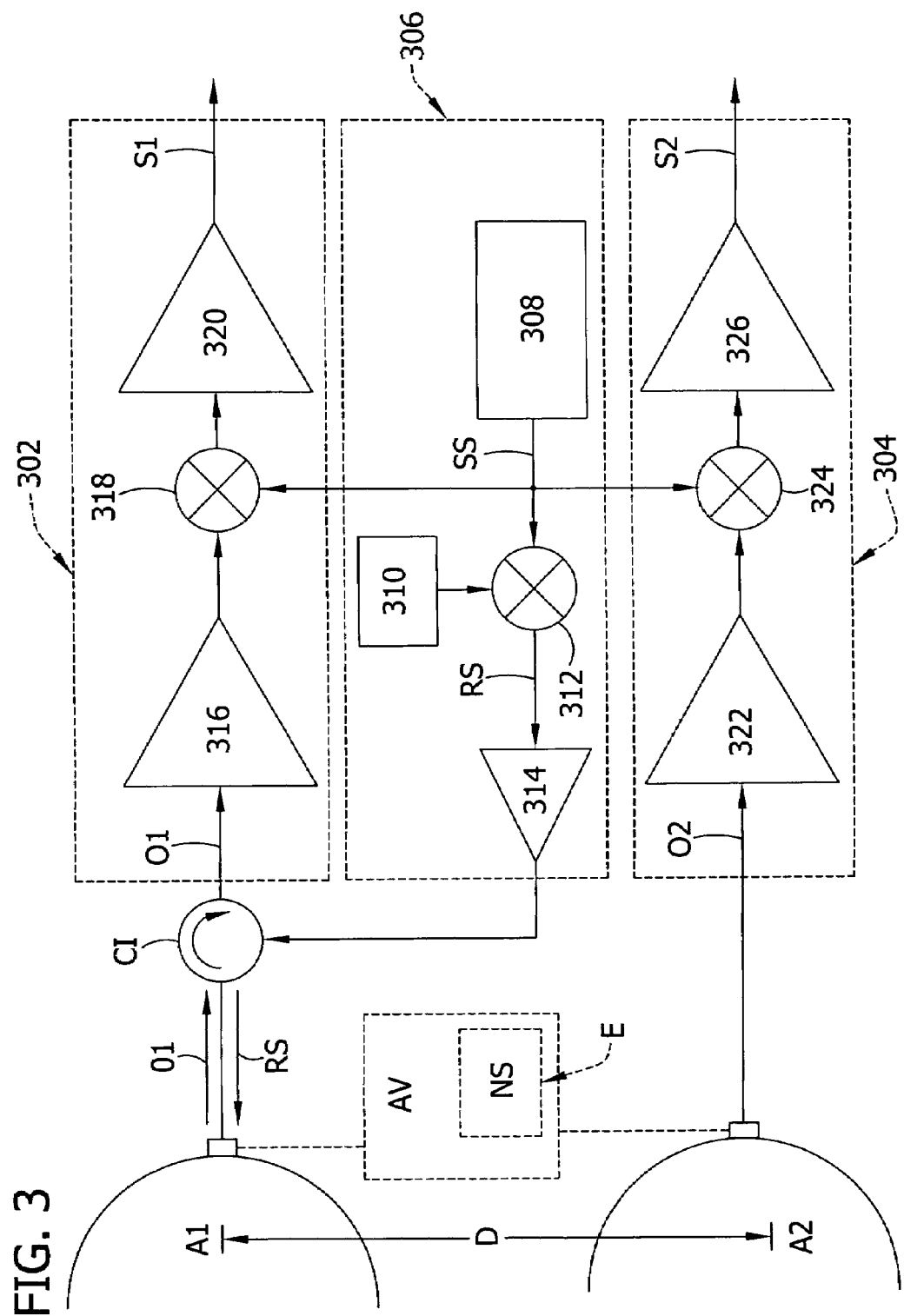
FIG. 3 is a block diagram illustrating one embodiment of two receivers for use with two vertically spaced antennas of a real beam radar system, according to the invention.

FIG. 3 shows a block diagram of a first receiver 302, a second receiver 304 and a signal generator circuit 306 according to one embodiment of the invention. First antenna A1 and second antenna A2 are located in the same vertical plane and are vertically separated such that their central points are separated by a distance D. The first antenna A1 transmits a real beam radar signal RS provided by the signal generator circuit and receives a reflected real beam radar signal. The second antenna A2 also receives the reflected real beam radar signal. It is also contemplated that an antenna other than the first antenna A1 and the second antenna A2 may transmit the real beam radar signal RS while the first antenna A1 and the second antenna A2 receive the reflected real beam radar signal. An antenna transmitting a real beam radar signal RS, the first antenna A1 receiving the reflected real beam radar signal, and the second antenna A2 receiving the reflected real beam radar signal operates continuously and simultaneously.

A circulator CI allows the first antenna A1 to both send and receive simultaneously. In the transmit mode, the circulator directs the real beam radar signal RS to be transmitted from a signal generator circuit 306 to the first antenna A1. In the receive mode, the circulator CI directs a first antenna output signal O1 corresponding to the received reflected radar signal from antenna A1 to the first receiver 302. The circulator CI performs both functions simultaneously.

The real beam radar signal RS transmitted by the first antenna A1 originates with a radio frequency local oscillator exciter 308 (RF-LO exciter). The RF-LO exciter 308 provides an exciter signal SS of a relatively low power, high frequency. An example of an exciter signal SS is a repeating 1 ms sweep from 77 Ghz to 77.6 Ghz. The exciter signal SS is then mixed by a generator circuit mixer 312 with a carrier signal produced by the local oscillator drive 310 (LO Drive) to create the real beam radar signal RS. An example of the carrier signal is a 1 Ghz signal. The real beam radar signal RS is then amplified by a low noise amplifier 314 and sent to the circulator CI.

The first antenna A1 receives the reflected real beam radar signal reflected by the target objects in each cell of the crossrange CR being scanned. The first antenna A1 provides the first antenna output signal O1 corresponding to the reflected real beam radar signal via the circulator CI to a low noise amplifier 316 to produce a first amplified antenna output signal which is fed into a first mixer 318 where it is mixed with the exciter signal SS from the RF-LO exciter 308. The mixer 318 produces a first intermediate frequency output mixed antenna signal which is amplified using another low noise amplifier 320 resulting in a first receiver output signal S1.

The second antenna A2 receives the reflected real beam radar signal reflected by the target objects in each cell of the crossrange CR being scanned. The second antenna A2 provides a second antenna output signal O2 corresponding to the reflected real beam radar. The second receiver 304 provides the second antenna output signal O2 to a low noise amplifier 322 to produce a second amplified antenna output signal fed into a second mixer 324 where it is mixed with the exciter signal SS from the RF-LO exciter 308. The mixer 324 produces a second intermediate frequency output antenna signal which is amplified using another low noise amplifier 326 resulting in a second receiver output signal S2.

The embodiment of FIG. 3 preserves the phase relationship between the first antenna output O1 and the second antenna output O2. Other embodiments may also be employed to preserve the phase relationship. For example, the first and second receivers may be built on the same chip in order to reduce phase error that thermal differences could induce. The first receiver 302 and second receiver 304 have the same components although it is contemplated that any receiver configuration may be employed. It is also contemplated that the first antenna A1 and second antenna A2 may receive only, if another antenna transmits the real beam radar signal RS, in which case, the circulator CI would not be required.

FIG. 4 illustrates a block diagram of one embodiment of a processor 400 of the present invention. The processor 400 uses the first receiver output signal S1 and the second receiver output signal S2 to determine the height H of every object in the crossrange CR being scanned.

One or more analog to digital converters (A/D converters) convert the first receiver output signal S1 and the second receiver output signal S2 into corresponding complex numbers, respectively. For example, a first A/D converter 402 converts the first receiver output signal S1 into a first in-phase signal I1 and a first quadrature signal Q1. A second A/D converter 404 converts the second receiver output signal S2 into a second in-phase signal I2 and a second quadrature signal Q2.

The processor 400 includes one or more fast Fourier transform components for processing the first in-phase signals and quadrature signals. In the embodiment illustrated, a first fast Fourier transform component 406 operates on the first in-phase signal I1 and the first quadrature signal Q1 to provide a corresponding signal representative of a first array of complex numbers A. Each element of the first array of complex numbers A corresponds to a specific range bin. A second fast Fourier transform component 408 operates on the second in-phase signal I2 and the second quadrature signal Q2 to provide a corresponding signal representative of a second array of complex numbers B. Each element of the second array of complex numbers B corresponds to a specific range bin in the same way as each element of the first array of complex numbers A.

The first array of complex numbers A and the second array of complex numbers B are selectively processed, such as by a multiplier component 410 to produce an output signal which is indicative of the phase difference Φ and thus the height H of each object in the crossrange CR. In one embodiment as illustrated in FIG. 4, the multiplier component 410 comprises: a complex conjugate multiplier 412, an arctangent component 414, and a height estimation component 416.

The complex conjugate multiplier 412 operates on the first array of complex numbers A and the second array of complex numbers B to produce a signal representative of a combined complex number array C. The first complex number in the first array of complex numbers A is multiplied by the complex conjugate of the first complex number in the second array of complex numbers B to arrive at the first complex number in the combined complex number array C. This is repeated for each element of the first array of complex numbers A. The result is an array of complex numbers wherein each complex number indicates the phase difference Φ for each range bin.

The arctangent component 414 extracts the phase difference information from the complex numbers in the combined complex number array C to create a phase difference array P. An approximation of the arctangent operation is performed on the first element of the combined complex number array C and the result is stored in the first element of the phase difference array P. This calculation is repeated for each element of the combined complex number array C and the phase difference array P results. The phase difference array P contains the necessary information to calculate the height H of the object in each cell for one crossrange CR of the area in front of the radar system.

The height estimation component 416 may be any component which performs the operations for determining height H. One function of the height estimation component 416 is to use the phase difference array P and the known range R value associated with each range bin of the phase difference array to calculate the height of the object in each cell of a particular crossrange CR, and provide a corresponding output signal. The component may also provide additional functions. For example, the height estimation component 416 may use information from electronic devices to account for variations in the pitch of the vehicle. This is optional, particularly if the vehicle pitch does not vary significantly or if the radar system pitch is maintained substantially horizontal by a mechanical system.

In the instant example, assuming the pitch variations of the system are compensated for mechanically, the height in each cell is approximated by the previously noted equation (6). The results of the operation on each element of the phase difference array P create the height array E. The output signal corresponds to this height array E. The height array E is combined with the height arrays from scans made at other crossrange CR dimensions to create a map of the entire area including the range R dimension, the crossrange CR dimension, and the height H of any object in the mapping area.

Once the first output signal S1 and second output signal S2 have been converted into a digital format by the first A/D converter 402 and the second A/D converter 404 respectively, the remaining signal processing may be implemented in a hardware configuration, software configuration, or a combination of the two. Any software aspects would be stored on a computer readable medium and may include computer executable instructions for determining the phase of the first output signal S1 and second output signal S2, computer executable instructions for determining the phase difference between the first reflected signal and the second reflected signal, and computer executable instructions for determining the height of the objects in each cell of the crossrange CR based on the phase difference. A software implementation can also be adapted to use information obtained in previous scans to check for consistency between scans and ultimately achieve a higher degree of height measurement accuracy. This function can also be implemented in hardware, but it is recognized that it may be more costly to do so and harder to upgrade any algorithms for this function.

Appendix A shows a software embodiment operating similarly to the above described processor 400 embodiment of FIG. 4. The software shown is a MATLAB program that extracts the phase difference array P from the digitized first output signal S1 and second output signal S2, and creates the height estimate array E. Lines in Appendix A following a '%' sign are comments. Lines 26 and 27 of Appendix A perform the Fourier transforms on the digitized first and second output signals S1 and S2. Line 35 determines the phase difference array P. Lines 42–44 provide the height estimate array E. Line 50 determines any targets within range R of the apparatus, and line 54 provides a list of the range R and height H of any determined targets.

The processor 400 may also analyze the first output signal S1 and the second output signal S2 for Doppler effects and other such phenomenon which may indicate moving objects in the area being mapped in order to track moving objects, or extract other information from the reflected signals.

The present invention has application in autonomous ground vehicle radar navigation, battlefield intrusion detection radar systems, and other fields where distinguishing the height of a target object is of interest. For example, interferometric height measurement using real beam radar is applicable to autonomous vehicle radars, cruise control radars, fixed battlefield short range radars, and intrusion detection radars at a minimum. Error compensation and signal processing may differ for these different applications.

In one embodiment, referring to FIG. 3, an autonomous vehicle AV would support the antennas A1, A2 and have a navigation system NS which would control the vehicle's direction of movement. The output E of the processor 400 (see FIG. 4) would be provided to the navigation system NS to assist in determining the direction of the vehicle AV. For example, the navigation system NS would determine whether to go over a particular obstacle or around the particular obstacle depending on the height of the particular obstacle as indicated by output E, and the navigation system NS would direct and/or otherwise control the vehicle AV accordingly.

In view of the above, it will be seen that the several objects of the invention are achieved and other advantageous results attained. When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

Appendix A

```
function [t, f, data, hits, targetHeightEstimates]=threedRa-
    darModel (tmin, sampletime, points, sigfreqpower, noise_
    power, mountingHeight, targetHeight, antennaSeparation,
    targetRange);
% 3dRadarModel Models a 3-D radar running on FMCW
% The portion "3dRadarModel (tmin, sampletime, points,
    sigfreqpower, noise_power,
% mountingHeight, targetHeight, antennaSeparation, targe-
    tRange)" detects signals.
% tmin is the beginning of the time sequence (nominally 0
    sec).
% sampletime is the time between samples, e.g., a 200 kHz
    complex; sampling radar will
% have 5e-6 sampletime (sec), i.e., the PRI.
% points is the number of time points.
% mountingheight is the height of the lower of the two
    antennas in meters.
% targetHeight is the height of the target in meters.
% antennaSeparation is the vertical separation of the two
    antennas in meters.
% targetRange is the horizontal range to the target in meters.
% lambda is the wavelength of the radar in meters.
lambda=0.0039; % wavelength in meters for 77 GHz opera-
    tion.
% Begin Height Estimation
% First, take the Fourier transform of the digitized first
    output signal S1 and second % output signal S2 sepa-
    rately. This produces the signal that would be found in
    each % range bin of an FMCW spectrum. The dataUpper
    and dataLower are the digitized first % output signal S1
    and second output signal S2s, each with in-phase and
    quadrature % components.
spectrumUpper=fft(dataUpper);
spectrumLower=fft(dataLower);
% This results in the spectrumUpper being the first array of
    complex numbers A and the % spectrumLower being the
    second array of complex numbers B. Next, determine the
    % phase difference between the range bins (or Doppler
    filters) by multiplying each % element of the first array of
    complex numbers A by its corresponding element in the %
    second array of complex numbers B. The modulus with
    respect to 2*pi is taken in % order to avoid ambiguity
    problems.

deltaPhiEstimate=mod(angle(spectrumUpper.*conj
        (spectrumLower)),2*pi);

% Next, calculate the target height. This line uses the
    formula from the % document for target height (equation
    6), applying it to all the values in % deltaPhiEstimate
    (phase difference array P). The result is a vector giving a
    height % estimate for each range bin. This produces a
    height estimate for each range bin of the % FMCW radar.

heightEstimate=mountingHeight-(((2*targetRange)*
        (lambda/(2*pi))*deltaPhiEstimate-antennaSepa-
        ration^2)/(2*antennaSeparation));

% End Height Estimation
% The next two functions present the data in a way that is
    more meaningful to a human % observer. The following
    routine determines if any targets were hit in the spectrum
    or % range bins.
[hits, hit_index]=detection (dataUpper, f);
% This function produces a list of the targets found, the
    range at which they are located, % and their approximate
    height.
targetHeightEstimates=heightEstimate(hit_index);
```

What is claimed is:

1. A system for determining a height h of an object on the ground and reflecting a real beam radar signal, said system comprising:
    a first antenna having a central point at a height l above the ground and wherein R is the distance from the vertical plane of the first antenna to the object, said first antenna receiving the reflected real beam radar signal and providing a first antenna output signal corresponding to the reflected real beam radar signal received by the first antenna;
    a second antenna receiving the reflected real beam radar signal and providing a second antenna output signal corresponding to the reflected real beam radar signal received by the second antenna;
    wherein the central point of the first antenna is positioned in a horizontal plane which is different than a horizontal plane in which the central point of the second antenna is positioned and wherein the central point of the first antenna is positioned at a vertical distance d from the central point of the second antenna;
    a first receiver for receiving the first antenna output signal and providing a first receiver output signal indicating the phase of the signal received by the first antenna;
    a second receiver for receiving the second antenna output signal and providing a second receiver output signal indicating the phase of the signal received by the second antenna; and
    a processor for receiving the first receiver output signal and the second receiver output signal and for providing an output signal corresponding to the height of the object, wherein the output signal is a function of the phase difference $\Phi$ between the first antenna output signal and the second antenna output signal, the distance R, the height l and the distance d.

2. The system of claim 1 wherein:
    the first receiver receives the first antenna output signal and provides a first receiver output signal having a phase corresponding to the phase of the signal received by the first antenna;
    the second receiver receives the second antenna output signal and provides a second receiver output signal having a phase corresponding to the phase of the signal received by the second antenna; and
    the processor receives the first receiver output signal and the second receiver output signal and provides an output signal corresponding to the height of the object.

3. The system of claim 2 wherein the first and second receivers for producing the first and second receiver output signals each comprise:
    a low noise amplifier for amplifying the antenna output signal to produce an amplified antenna output signal;
    a mixer for mixing an exciter signal with the amplified antenna output signal to produce an intermediate frequency output antenna signal; and
    a low noise amplifier for amplifying the intermediate frequency output antenna signal to produce the receiver output signal.

4. The system of claim 2 wherein the processor generates a first in-phase signal corresponding to an in-phase component of the first receiver output signal, a first quadrature signal corresponding to a quadrature component of the first receiver output signal, a second in-phase signal corresponding to an in-phase component of the second receiver output signal, and a second quadrature signal corresponding to a quadrature component of the second receiver output signal.

5. The system of claim 4 wherein the processor comprises:
a first Fast Fourier Transform component for processing the first in-phase signal and first quadrature signal and producing a signal representative of a first array of complex numbers corresponding to the first in-phase signal and first quadrature signal wherein each position within the array corresponds to a particular range value;
a second Fast Fourier Transform component for processing the second in-phase signal and second quadrature signal and producing a signal representative of a second array of complex numbers corresponding to the second in-phase signal and second quadrature signal wherein each position within the array corresponds to a particular range value; and
a multiplier component for selectively multiplying the first array of complex numbers and the second array of complex numbers to produce the output signal which corresponds to the height of the object.

6. The system of claim 5 wherein the multiplier component comprises:
a complex conjugate multiplier component for producing a signal representative of a combined complex number array corresponding to multiplying an element of the first array of complex numbers with the complex conjugate of its corresponding element in the second array of complex numbers;
an arctangent component for producing a signal representative of a phase difference array from the combined complex number array; and
a height estimation component for producing the output signal which is representative of a height array corresponding to multiplying an element of the phase difference array by an approximate distance from the first antenna to the object.

7. The system of claim 2 wherein the processor determines a range of the object as a function of the first or second antenna output signal and wherein the processor determines the height of the object as a function of the phase difference and the range.

8. The system of claim 1 wherein the processor determines the height h of the object as approximated by:

$$h = l + \frac{d^2 - \Phi 2R\lambda}{4d\pi}$$

wherein
$\lambda$ is the wavelength of the real beam radar signal.

9. A method for determining a height of an object on the ground and reflecting a real beam radar signal, said method comprising:
determining the phase of a reflected real beam radar signal received at a first vertical height l above the ground at a location which is a distance R from the object;
determining the phase of the reflected real beam radar signal received at a second vertical height d above the first vertical height;
determining a phase difference $\Phi$ between the first reflected real beam radar signal and the second reflected real beam radar signal; and
determining the height of the object based on the determined phase difference $\Phi$, the distance R, the height l and the distance d.

10. A method for determining a height h of an object on the ground and reflecting a real beam radar signal, said method comprising:
receiving a first reflected real beam radar signal at a distance R from the object;
receiving a second reflected real beam radar signal at a vertical distance d above a vertical height l at which the first reflected real beam signal is received;
generating a first phase signal indicating the phase of the received first reflected real beam radar signal;
generating a second phase signal indicating the phase of the received second reflected real beam radar signal;
providing an output signal corresponding to the height h of the object, wherein the output signal is a function of the phase difference 101 between the first phase signal and the second phase signal, a distance R, the height l and the distance d.

11. The method of claim 10 wherein the first reflected real beam radar signal is received in a horizontal plane which is different than a horizontal plane in which the second reflected real beam radar signal is received.

12. The method of claim 10 wherein:
generating the first phase signal comprises providing a first receiver output signal having a phase corresponding to the phase of the received first reflected real beam radar signal;
generating the second phase signal comprises providing a second receiver output signal having a phase corresponding to the phase of the received second reflected real beam radar signal; and
the provided output signal is a function of the first phase signal and the second phase signal.

13. The method of claim 12 wherein the first and second phase signals are each mixed with an exciter signal to produce the first and second receiver output signals, respectively.

14. The method of claim 12 wherein providing the output signal comprises:
generating a first in-phase signal corresponding to an in-phase component of the first receiver output signal;
generating a first quadrature signal corresponding to a quadrature component of the first receiver output signal;
generating a second in-phase signal corresponding to an in-phase component of the second receiver output signal; and
generating a second quadrature signal corresponding to a quadrature component of the second receiver output signal.

15. The method of claim 14 wherein providing the output signal comprises:
processing the first in-phase signal and first quadrature signal and producing a signal representative of a first array of complex numbers corresponding to the first in-phase signal and first quadrature signal;
processing the second in-phase signal and second quadrature signal and producing a signal representative of a second array of complex numbers corresponding to the second in-phase signal and second quadrature signal; and
selectively multiplying the first array of complex numbers and the second array of complex numbers to produce the output signal corresponding to the height of the object.

16. The method of claim 15 wherein processing the first in-phase signal and the first quadrature signal comprises performing a fast Fourier transform of the first in-phase signal and the first quadrature signal; and wherein processing the second in-phase signal and the second quadrature signal comprises performing a fast Fourier transform of the second in-phase signal and the second quadrature signal.

17. The method of claim 15 wherein the selective multiplying comprises:
producing a signal representative of a combined complex number array corresponding to multiplying an element of the first array of complex numbers with the complex conjugate of its corresponding element in the second array of complex numbers;
producing a signal representative of a phase difference array from the combined complex number array; and
producing the output signal which is representative of a height array corresponding to multiplying an element of the phase difference array by an approximate distance from the first or second antenna to the object.

18. The method of claim 12 wherein providing the output signal comprises:
determining a range of the object as a function of the received first or second reflected real beam radar signal; and
determining the height of the object as a function of the phase difference and the range.

19. The method of claim 10 wherein, in providing the output signal, the height of the object that said output signal corresponds to is approximated by:

$$h = l + \frac{d^2 - \Phi 2R\lambda}{4d\pi}$$

wherein
$\lambda$ is the wavelength of the real beam radar signal.

20. In a vehicle having an autonomous vehicle navigation system for determining a height of an object on the ground and reflecting a real beam radar signal, said vehicle including a navigation system for controlling the vehicle the improvement comprising:
a first antenna mounted on the vehicle having a central point at a height l above the ground and wherein R is the distance from the vertical plane of the first antenna to the object, said first antenna for receiving the reflected real beam radar signal and providing a first antenna output signal corresponding to the reflected real beam radar signal received by the first antenna;
a second antenna mounted on the vehicle for receiving the reflected real beam radar signal and providing a second antenna output signal corresponding to the reflected real beam radar signal received by the second antenna wherein the central point of the first antenna is positioned in a horizontal plane at a vertical distance d above a horizontal plane in which the central point of the second antenna is positioned;
a first receiver for receiving the first antenna output and providing a first receiver output signal indicating the phase of the signal received by the first antenna;
a second receiver for receiving the second antenna output and providing a second receiver output signal indicating the phase of the signal received by the second antenna; and
a processor for receiving the first receiver output signal and the second receiver output signal and for providing an output signal corresponding to the height of the object, wherein the output signal is a function of the phase difference $\Phi$ between the first antenna output and the second antenna output, the distance R, the height l and the distance d;
whereby the navigation system controls the vehicle as a function of the output signal.

21. A computer-readable medium having computer-executable instructions for determining a height of an object on the ground and reflecting a real beam radar signal, said instructions comprising:
instructions for determining the phase of a first reflected signal received at a first vertical height;
instructions for determining the phase of a second reflected signal received at a second vertical height different than the first vertical height;
instructions for determining a phase difference $\Phi$ between the first reflected signal and the second reflected signal; and
instructions for determining the height h of the object based on the determined phase difference $\Phi$, a distance R between the object and a vertical plane at a location where the phase of the first reflected signal is determined, a height l of a first horizontal plane at the location where the phase of the first reflected signal is determined, and a distance d between the first horizontal plane and a second horizontal plane at the location where the phase of the second reflected signal is determined.

* * * * *